United States Patent
Thames et al.

[11] Patent Number: 5,573,074
[45] Date of Patent: Nov. 12, 1996

[54] GEAR SHIFTING POWER TOOL

[75] Inventors: Bruce A. Thames, Cypress; Robert A. Pennison, Bellville, both of Tex.

[73] Assignee: GPX Corp., Las Vegas, Nev.

[21] Appl. No.: 387,227

[22] Filed: Feb. 13, 1995

[51] Int. Cl.⁶ .................................................. B25B 23/14
[52] U.S. Cl. .................... 173/178; 192/56.57; 192/56.62
[58] Field of Search ..................................... 173/178, 176; 81/473, 475; 192/56.57, 56.62

[56] References Cited

U.S. PATENT DOCUMENTS

| | | | |
|---|---|---|---|
| 3,116,617 | 1/1964 | Skoog | 64/26 |
| 3,373,824 | 3/1968 | Whitehouse | 173/12 |
| 3,472,081 | 10/1969 | Keller et al. | 74/48 |
| 3,556,230 | 1/1971 | Roggenburk | 172/93.5 |
| 3,586,115 | 6/1971 | Amtsberg et al. | 173/163 |
| 3,610,343 | 10/1971 | Bratt | 173/12 |
| 3,696,871 | 10/1972 | Stenbacka | 173/12 |
| 3,739,659 | 6/1973 | Workman, Jr. | 74/751 |
| 3,809,179 | 5/1974 | Delaney, Jr. et al. | 181/36 |
| 3,871,138 | 3/1975 | Welsch | 51/170 |
| 3,993,145 | 11/1976 | Findeli | 173/176 |
| 4,071,092 | 1/1978 | Wallace | 173/178 |
| 4,078,618 | 3/1978 | DePagter et al. | 173/178 |
| 4,120,604 | 10/1978 | Garofalo | 415/25 |
| 4,147,219 | 4/1979 | Wallace | 173/12 |
| 4,155,278 | 5/1979 | Estok | 81/57.11 |
| 4,266,444 | 5/1981 | Anderson et al. | 74/661 |
| 4,300,641 | 11/1981 | Kinkel | 173/12 |
| 4,307,784 | 12/1981 | Smith | 173/12 |
| 4,359,107 | 11/1982 | Smith | 173/12 |
| 4,434,858 | 3/1984 | Whitehouse | 173/12 |
| 4,462,282 | 7/1984 | Biek | 81/57.11 |
| 4,484,871 | 11/1984 | Adman et al. | 418/69 |
| 4,522,269 | 6/1985 | Adman et al. | 173/12 |
| 4,553,948 | 11/1985 | Tatsuno | 464/25 |
| 4,766,787 | 8/1988 | Sugimoto et al. | 81/463 |
| 4,789,373 | 12/1988 | Adman | 464/25 |
| 4,836,296 | 6/1989 | Biek | 173/93.5 |
| 4,844,177 | 7/1989 | Robinson et al. | 173/12 |
| 4,869,139 | 9/1989 | Gotman | 81/475 |
| 4,880,064 | 11/1989 | Willoughby et al. | 173/12 |
| 4,991,473 | 2/1991 | Gotman | 81/475 |
| 5,080,181 | 1/1992 | Tatsuno | 173/93.5 |
| 5,092,410 | 3/1992 | Wallace et al. | 173/93.5 |
| 5,156,244 | 10/1992 | Pyles et al. | 173/178 |
| 5,181,575 | 1/1993 | Maruyama et al. | 173/180 |
| 5,201,374 | 4/1993 | Rahm | 173/176 |
| 5,203,242 | 4/1993 | Hansson | 81/469 |
| 5,505,676 | 4/1996 | Bookshar | 173/178 |

OTHER PUBLICATIONS

*Atlas Copco* 1987 Catalog, "Industrial Power Tools" (five pages).
*Cleco* 1993 Catalog, "Cleco Air Tools" (four pages).
*Ingersoll–Rand* 1989 Catalog (four pages).

*Primary Examiner*—Scott A. Smith
*Attorney, Agent, or Firm*—Baker & Botts, L.L.P.

[57] ABSTRACT

A gear shifting power tool (10) includes a rotatably-driven, torque-responsive, gear shift device (30). Rotatably-driven, torque-responsive, gear shift device (30) may include drive spindle (38), plunger (54) positioned within drive spindle (38). Drive spindle (38) has first hole pair (44) and second hole pair (46) in which first ball pair (48) and second ball pair (50) contact plunger (54). Drive clutch member (32) is drivably engaged to drive spindle (38) through ball screw arrangement (64). Drive clutch member (32) disengages from driven clutch member (34) in response to a resistive torque overcoming torque spring (40). Inertial device (62) forces first ball pair (48) into one end of plunger (54) which forces plunger (54) towards reset spring (60). Plunger (54) forces second ball pair (46) into inner axial groove (36) of drive clutch member (32) and prevents drive clutch member (32) from engaging driven clutch member (34) until all rotation ceases.

42 Claims, 2 Drawing Sheets

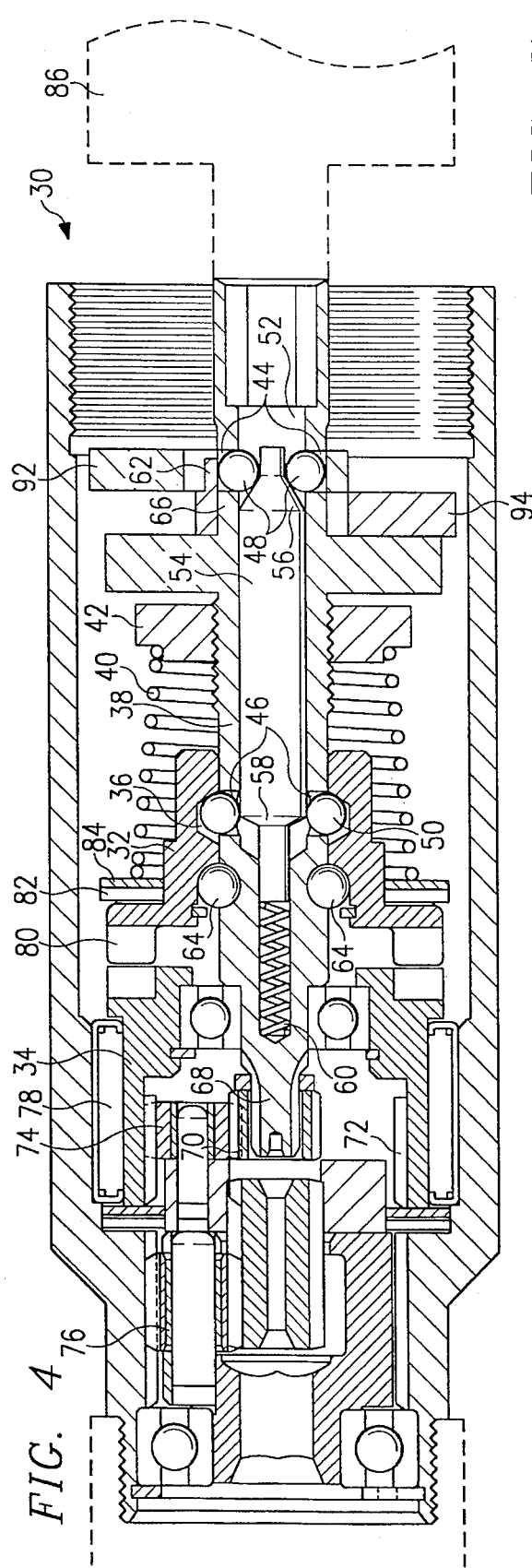
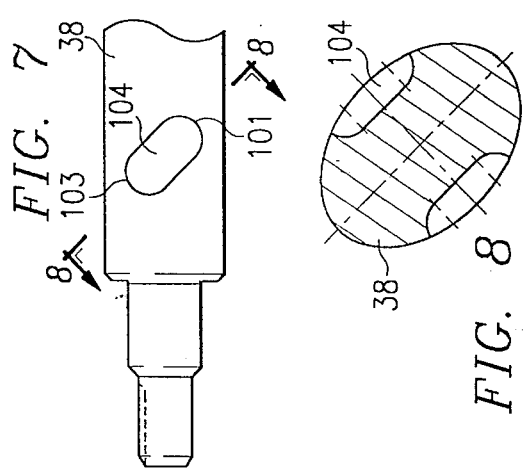
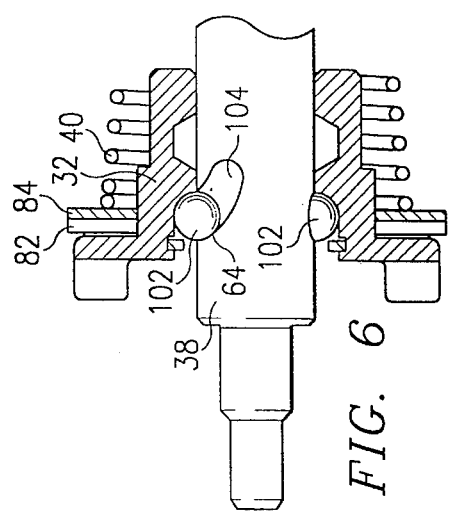
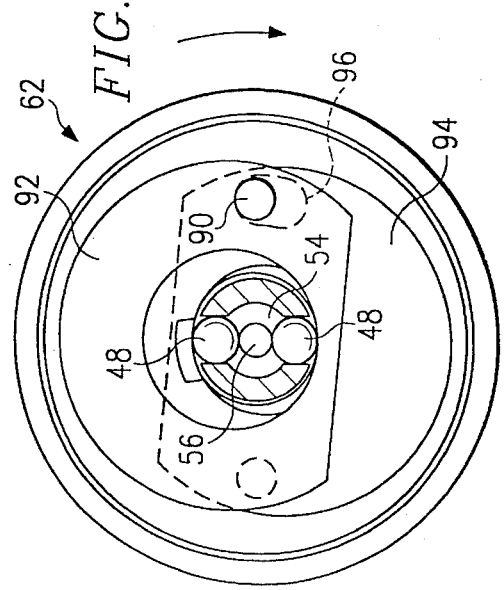

GEAR SHIFTING POWER TOOL

TECHNICAL FIELD OF THE INVENTION

This invention relates in general to the field of gear shifting devices, more particularly to a gear shifting power tool.

BACKGROUND OF THE INVENTION

Power tools such as nut runners, drills, grinders, sanders, or similar type tools provide a rotating shaft at a given speed and torque. Depending on the function being performed, it is often advantageous to provide a rotating shaft at different speeds and different torques. The speed and torque of a rotating shaft may be altered through the use of gears.

When using a power tool to rotate a fastener, it is often desirable to rotate the fastener at a high speed throughout the fastening process until the fastener is almost tightened or otherwise meeting with additional resistance. During final tightening or increased resistance, it is often advantageous to apply a low speed rotation with a higher torque. The speed and torque of a rotating shaft in a power tool may be altered by engaging and disengaging various gears. The engaging and disengaging of gears for changing the speed and torque of the rotating shaft may be accomplished through clutch members operable in response to fluid pressure.

Disadvantages of known speed shifting mechanisms may include component deterioration, jammed parts and frequent maintenance. Some types of speed shifting devices used in power tools do not provide for an adjustable torque setting. Other disadvantages with gear shifting power tools may include using fluid driven clutch members for engaging and disengaging gears that tend to be expensive, less reliable, and maintenance intensive. Other disadvantages may include shifting a power tool from a relative high speed/low torque rotation to a relative low speed/high torque rotation without a mechanism or means to ensure that the power tool will maintain the low speed/high torque condition so that proper tightening may be applied or so that a proper or desired torque may be applied. Additionally, some devices require two motors in order to achieve the high torque needed for a final tightening; one motor may rotate the output for a high speed/low torque output while another motor is added to achieve the high torque needed for final tightening.

SUMMARY OF THE INVENTION

In accordance with the present invention, the disadvantages and problems associated with the previous techniques and devices used for shifting gears in response to an applied torque have been substantially reduced or eliminated by the present invention. One aspect of the present invention provides a gear shift device that shifts from a high speed/low torque output condition to a low speed/high torque output condition in response to a resistive torque applied at the output.

In accordance with another aspect of the invention, a rotatably-driven, torque-responsive, gear shift device is provided that may include a drive spindle having two ends. An inertial device couples to the drive spindle and a drive clutch member engages the drive spindle. A biasing means assists in positioning the drive clutch member relative to the drive spindle.

In accordance with another aspect of the invention, a rotatably-driven, torque-responsive, gear shift device is provided that may include a drive spindle having holes and a partially hollow interior volume. A plunger having two ends locates within the partially hollow interior volume of the drive spindle. The plunger is biased on its second end by a reset biasing means. A first ball movably positions within a hole of the drive spindle while a second ball movably positions within another hole of the drive spindle. An inertial device provides a longitudinal force to the plunger. A drive clutch member, drivably engages the drive spindle. Finally, a biasing means assists in maintaining the drive spindle and the drive clutch member.

In accordance with yet another aspect of the present invention, a method for shifting gears in response to an applied resistive torque is provided that may include the steps of engaging a drive clutch member to a driven clutch member. The drive clutch member drivably engages a drive spindle. Rotating the drive spindle results in a radially inward force being applied to a plunger which results in a force being applied opposite a biasing applied to the plunger. When a sufficient torque is applied to the drive spindle, resisting the rotation of the drive spindle, the drive clutch member disengages from the driven clutch member. A means may be provided to prevent the drive clutch member from reengaging with the driven clutch member.

Technical advantages of the present invention include allowing the use of a lower revolutions per minute or lower rpm motor to drive a gear shifting device as compared to many prior art power tools. Another technical advantage may include that the invention typically allows the use of an oil-free motor running at a lower rpm and using less horsepower yet still delivering the desired output speed and torque. When the motor driving the gear shifting power tool is a pneumatic motor or air driven motor, advantages are realized by a reduction in air consumption and hence reduced noise levels and cost.

Other technical advantages include adjustable automatic shifting from an output having high speed/low torque to an output having low speed/high torque. The torque at which gear shifting occurs may be adjusted based on adjusting the biasing means for applying a force between the drive spindle and the drive clutch member. Other technical advantages of the present invention may include the reduced size and weight of the gear shifting power tools according to one embodiment of the invention because of self-contained operation.

Additional technical advantages of the present invention may include increased responsiveness to applied torques because of the absence of any external fluids needed for applying pressure to engage and disengage clutch members. Other technical advantages also include low speed/high torque operation without accidental reengagement of the clutch members because the invention ensures that the gear shifting power tool will stay in a low speed/high torque condition until all rotation stops.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a cross-sectional view, with portions broken away, of the power tool of FIG. 2 except shown in a low speed/high torque or disengaged mode;

FIG. 5 is a cross-sectional view, with portions broken away, of the inertial device of the power tool of FIG. 4;

FIG. 6 is a schematic view of a ball screw interconnection between a drive spindle and a drive clutch member which may be included as an aspect of the present invention;

FIG. 7 is a perspective view of the ball screw keyway on the drive spindle of FIG. 6; and FIG. 8 is an angled cross-sectional view of the drive spindle of FIG. 7 taken along line 8—8 in FIG. 7.

DETAILED DESCRIPTION OF THE INVENTION

The present invention and its advantages are better understood by referring to FIGS. 1–8 of the drawings, like numerals being used for like and corresponding parts of the various drawings. The invention may be used with or as a unique redesign of any number of power tools such as the power tools described in U.S. Pat. No. 4,359,107, entitled "Shut-Off Apparatus for Pneumatic Driven Tools" which is incorporated herein by reference for all purposes. It should be understood that the invention is applicable to other power tools as well. The FIGURES only illustrate one embodiment of the present invention. The environment and components of the embodiment will first be presented and then its operation.

Figure 1:
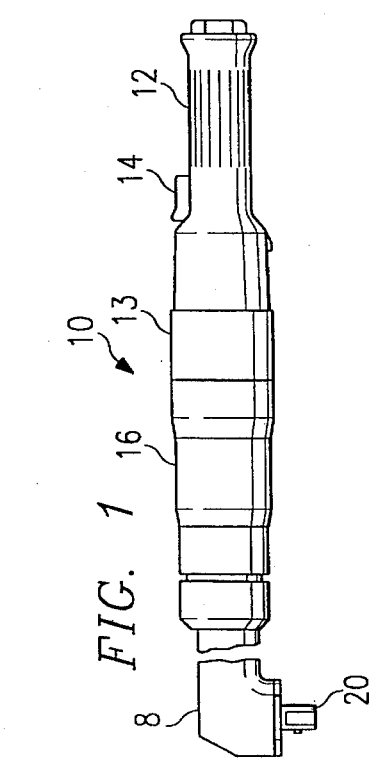
FIG. 1 is a perspective view of a power tool according to one aspect of the present invention.

FIG. 1 illustrates power tool 10 with a casing 13 and including a rotatably-driven, torque-responsive, gear shift device in accordance with the present invention. Power tool 10 includes handle 12 for gripping, on/off switch 14 for controlling the input power to power tool 10, tool body 16, and right angle head 18 including output drive 20. Output drive 20 provides output rotational motion to an output attachment (not shown) that may grip a fastener or other item to be acted on by tool 10.

Figure 2:
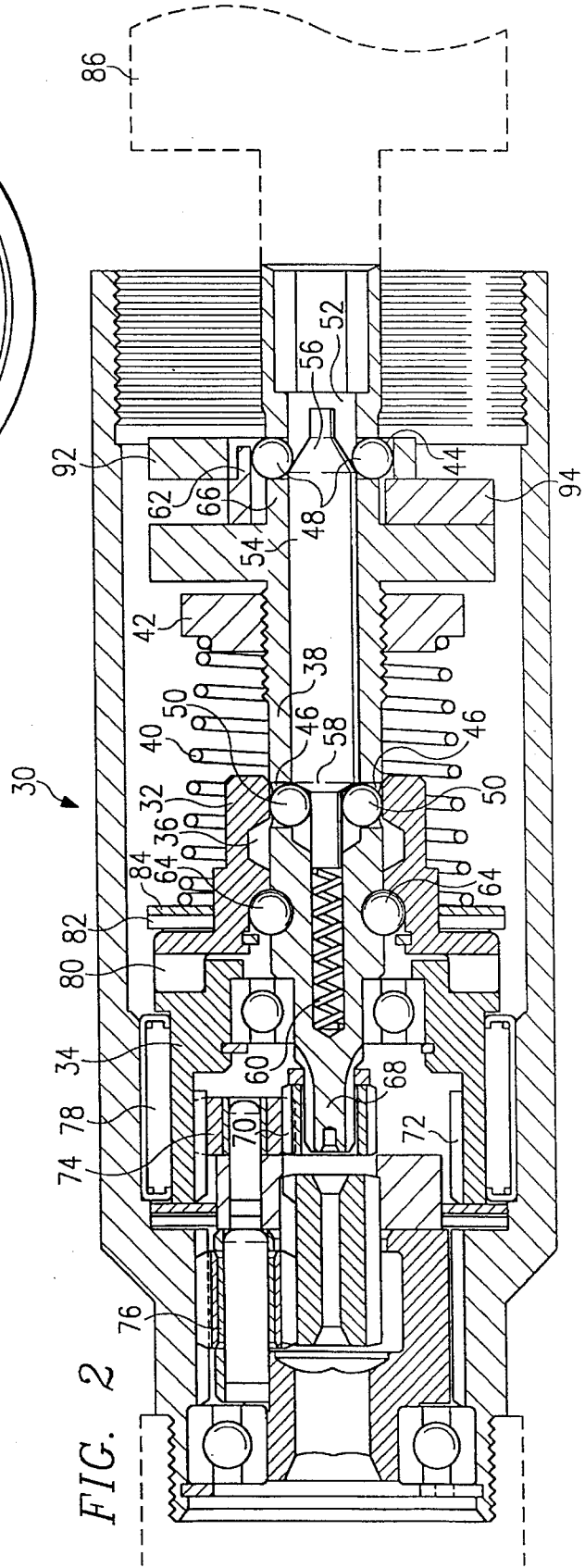
FIG. 2 is a cross-sectional view, with portions broken away, of a power tool according to one aspect of the present invention shown in a high speed/low torque or engaged mode.

FIG. 2 is a cross-sectional view, with portions broken away, of rotatably-driven, torque-responsive, gear shift device 30 showing drive clutch member 32 engaged to driven clutch member 34. This illustrates the engaged mode of gear shift device 30, which is the mode having relative high speed/low torque. Drive clutch member 32 has an inner axial groove 36 and is drivably engaged to drive spindle 38. Inner axial groove 36 could also be a slot or multiple slots positioned to receive a corresponding ball or balls when drive clutch member 32 disengages from drive clutch member 34. Drive spindle 38 has a first end 66 and a second end 68. Second end 68 of drive spindle 38 may serve as a pinion for a plurality of gears, or gear set, such as shown by pinion gear 70. First end 66 may be coupled to motor drive 86 for providing rotational motion thereto when energized.

Drive clutch member 32 is drivably engaged to drive spindle 38 through ball screw arrangement 64. See also FIGS. 6–8. Drive clutch member 32 has clutch dogs 80 for engaging driven clutch member 34. Drive spindle 38 and drive clutch member 32 may be biased away from each other by any biasing means, e.g., torque spring 40. Torque spring 40 is longitudinally positioned between drive spindle 38 and drive clutch member 32. Torque spring 40 couples to drive clutch member 32 by thrust bearing 82 and thrust race 84. Torque spring 40 may be coupled to drive clutch member 32 through any arrangement providing equivalent coupling. Torque spring 40 couples with drive spindle 38 through adjustment nut 42. The compression on torque spring 40 may be varied through the positioning of adjustment nut 42. Torque spring 40 may be sized to preference. Drive spindle 38 has first hole pair 44 and second hole pair 46 and a partially hollow interior volume 52. The two holes of first hole pair 44 may be spaced 180 degrees from one another on drive spindle 38 as shown in the embodiment of FIG. 2. This is also true for the two holes of second hole pair 48. The present invention allows spacing of each hole around drive spindle 38 at any angle or distance. First and second hole pairs 44 and 46 may be one, two, three or more holes each. When multiple holes are utilized, they may be spaced symmetrically or asymmetrically. First ball pair 48 is disposed within first hole pair 44 while second ball pair 50 is disposed within second hole pair 46.

Partially hollow interior volume 52 of drive spindle 38 contains plunger 54. Plunger 54 provides first tapered end 56 and second tapered end 58. Reset spring 60 couples to plunger 54 at second tapered end 58. Reset spring 60 biases plunger 54. First ball pair 48 contacts first tapered end 56 of plunger 54, while second ball pair 50 contacts second tapered end 58 of plunger 54. Inertial device 62 couples to drive spindle 38 near first hole pair 44. Inertial device 62 contacts first ball pair 48 positioned within first hole pair 44.

Driven clutch member 34 provides ring gear 72 for driving a gear set. Ring gear 72 of driven clutch member 34 may directly drive planetary gears and planet carrier at the rotational speed of drive spindle 38. One-way clutch 78 allows driven clutch member 34, having ring gear 72, to rotate in only one direction. One-way clutch 78 may be a sprag clutch or any other device for allowing movement in one direction.

Figure 3:
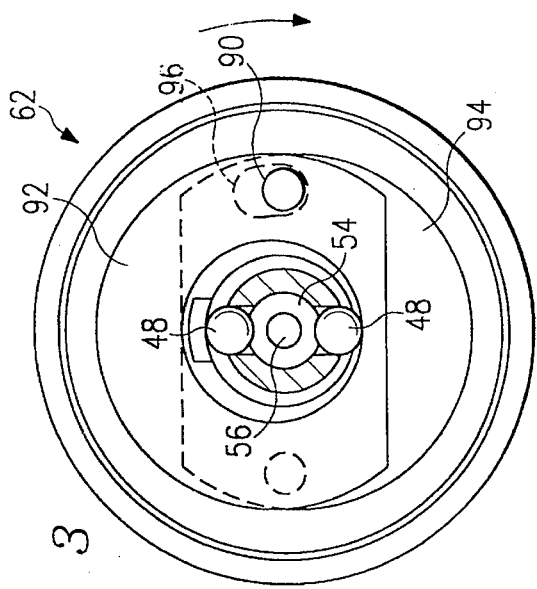
FIG. 3 is a cross-sectional view, with portions broken away, of the inertial device of the power tool of FIG. 2.

FIG. 3 shows a cross-sectional view of inertial device 62 in which rotatably-driven, torque-responsive, gear shift device 30 is in engaged mode as shown in FIG. 2. Inertial device 62 may include dowel pin 90, first disc 92, and second disc 94. Other types of inertial devices could be used with some aspects of the present invention, such as the inertial device shown in U.S. Pat. No. 4,359,107, entitled "Shut-Off Apparatus for Pneumatic Driven Tools", which is incorporated herein by reference for all purposes. FIG. 3 also illustrates plunger 54, first ball pair 48, and first tapered end 56. Inertial device 62 contacts and retains first ball pair 48. First disc 92 and second disc 94 couple to drive spindle 38 by dowel pins (not shown). First disc 92 and second disc 94 are eccentric with respect to the axis of rotation of drive spindle 38. Therefore, rotation of drive spindle 38 causes first disc 92 and second disc 94 to force first ball pair 48 radially inward. First ball pair 48 exerts inward force upon plunger 54 at first tapered end 56. The radially inward force exerted on first tapered end 56 translates into an axial or longitudinal force on plunger 54 towards second tapered end 58 and driven clutch member 34.

FIG. 4 illustrates rotatably-driven, torque-responsive, gear shift device 30 as shown in FIG. 2 except with drive clutch member 32 disengaged from driven clutch member 34 (the disengaged mode). The description of FIG. 2 applies equally here except that gear shift device 30 is in disengaged mode. FIG. 4 shows rotatably-driven, torque-responsive, gear shift device 30 in a disengaged mode or low speed/high torque mode. As will be described in more detail later, the shift device 30 shifts from the engaged mode to the disengaged mode in response to a desired resistive torque applied at the output. In the disengaged mode, torque spring 40 is shown more compressed than in FIG. 2, and drive clutch member 32 is shown longitudinally or axially displaced from driven clutch member 34. Inner axial groove 36 aligns with second hole pair 46, allowing second ball pair 50 to occupy inner axial groove 36. Inertial device 62 contacts first ball pair 48, shown radially displaced inwardly and contacting plunger 54 at first tapered end 56. Plunger 54 is axially or longitudinally displaced towards second tapered end 58 and compresses reset spring 60. The disengagement of drive clutch member 32 from driven clutch member 34 allows drive spindle 38 at second end 68, serving as pinion gear 70, to directly drive first reduction idler gear 74. During disengagement, one way clutch 78 prevents ring gear 72 from rotating in the opposite direction.

FIG. 5 illustrates inertial device 62, also shown in FIG. 3, except with rotatably-driven, torque-responsive, gear shift device 30 in disengaged mode as shown in FIG. 4. First disc 92 and second disc 94 apply a radially inward force on first ball pair 48 and inwardly displace first ball pair 48. First ball pair 48 contacts plunger 54 at first tapered end 56 to apply a force thereto.

FIG. 6 further illustrates ball screw arrangement 64 showing the ball screw interconnection between drive spindle 38 and drive clutch member 32. Ball keys 102 are shown as movably positioned in ball screw keyways 104. Ball screw arrangement 64 drivably engages drive clutch member 32 and drive spindle 38 in response to rotation. When a resistive torque applied to rotating drive spindle 38 overcomes the compression of torque spring 40, ball keys 102 will have moved in ball screw keyways 104 sufficiently to result in drive clutch member 32 being axially displaced away from driven clutch member 34. Ball screw arrangement 64 may be any arrangement that allows drive clutch member 32 to move axially or longitudinally along drive spindle 38. FIG. 7 illustrates ball screw keyway 104 positioned on drive spindle 38. FIG. 8 is a cross-sectional view of ball screw keyways 104 and drive spindle 38 taken along line 8—8 in FIG. 7. Ball screw keyway 104 has a first end 101 and a second end 103.

In operation, the gear shift device changes gears in response to an applied resistive torque and shifts from an output rotational motion having a relative high speed/low torque to an output rotational motion having relative low speed/high torque. This occurs when shifting from engaged mode to disengaged mode.

In the one embodiment shown, the gear shift device 30 may operate according to the following steps. Referring to FIG. 2, before any rotation of drive spindle 38, drive clutch member 32 engages driven clutch member 34 of rotatably-driven, torque-responsive, gear shift device 30. Drive clutch member 32 and drive spindle 38 are drivably engaged by ball screw arrangement 64 with ball keys 102 nearest first end 101 and hence are in engaged mode or high speed/low torque mode. This arrangement allows drive clutch member 32, drive spindle 38, and driven clutch member 34, to rotate together.

Reset spring 60 couples to plunger 54 at second tapered end 58. The arrangement of reset spring 60 and plunger 54 resists axial or longitudinal movement of plunger 54 towards reset spring 60, as shown in FIGS. 2 and 4. Reset spring 60 may couple to plunger 54 at other locations on plunger 54 and achieve the same effect. For example, reset spring 60 may be positioned concentrically around plunger 54 or attached at first tapered end 56. Second ball pair 50 contact plunger 54 around second tapered end 58 while remaining disposed in second hole pair 46. First ball pair 48 contact plunger 54 near first tapered end 56 while first ball pair 48 remains disposed in first hole pair 44. Although this embodiment shows a first ball pair 48 disposed in first hole pair 44, one ball disposed in one hole would probably provide the same effect as would multiple balls each disposed in a corresponding hole.

Drive spindle 38 couples to motor drive 86 and provides rotational motion thereto when energized. The rotational motion of motor drive 86 rotates drive spindle 38 and hence rotates drivably engaged drive clutch member 32. Torque spring 40 rotates with drive spindle 38 and drive clutch member 32.

Inertial device 62 couples to drive spindle 38 and applies a radially inward force on first ball pair 48 in response to rotation. The radially inward force applied to ball pair 48 forces ball pair 48, disposed in first hole pair 44 of drive spindle 38, into first tapered end 56 of plunger 54. First tapered end 56 translates this radially inward force to an axial or longitudinal force directed towards reset spring 60. The translation of a radially inward force to a longitudinal force on plunger 54 may be accomplished through using first tapered end 56 of plunger 54 as shown in FIGS. 2 and 4 or by any other known method of translating a force in one direction to another direction. Plunger 54 forces second ball pair 50 through second hole pair 46 and into inner axial groove 36 of drive clutch member 32 because second tapered end 58 of plunger 54 translates this axial or longitudinal force on plunger 54 into a radially outward force on second ball pair 50. Second ball pair 50 resists the radially outward force by contacting drive clutch member 32. Second ball pair 50 cannot enter inner axial groove 36 because inner axial groove 36 is not positioned around second hold pair 46 when drive clutch member 32 is engaged to driven clutch member 34.

A resistive torque acts on the output of drive spindle 38 that resists the rotation of drive spindle 38. The rotation is a result of motor drive 86 rotating drive spindle 38. When the resistive torque reaches a level that overcomes torque spring 40, torque spring 40 will have compressed sufficiently to disengage drive clutch member 32. While torque spring 40 compresses, ball screw arrangement 64, having ball keys 102 and ball screw keyway 104 shown in FIGS. 6–8, forces drive clutch member 32 into torque spring 40 and away from driven clutch member 34. Drive clutch member 32 moves axially or longitudinally along drive spindle 38 while compressing torque spring 40.

After sufficient movement between the ball key arrangement 64, the radially outward force acting on second ball pair 50 will force second ball pair 50 into inner axial groove 36 of drive clutch member 32. The movement of second ball pair 50 into inner axial groove 36 of drive clutch member 32 allows plunger 54 to compress reset spring 60. The axial or longitudinal movement of plunger 54, in response to the radially inward force of first ball pair 48, allows first ball pair 48 to move radially inward while maintaining contact with first tapered end 56 of plunger 54.

Inertial device 62 continues to apply a radially inward force on first ball pair 48 and hence on first tapered end 56 of plunger 54 until rotation of rotatably-driven, torque-responsive, gear shift device 30 stops. This ensures that plunger 54 continues to compress reset spring 60 and hence maintain second ball pair 50 in inner axial groove 36 of drive clutch member 32 until all rotation of drive spindle 38 ceases. Displacement of second ball pair 50 into the inner axial groove 36 or other slots prevents drive clutch member 32 from engaging driven clutch member 34 as shown in FIG. 4 once it has disengaged. This ensures an output rotation having relative low speed/high torque.

During engagement of drive clutch member 32 and driven clutch member 34, ring gear 72 of driven clutch member 34 may directly drive planetary gears and a planet carrier at the rotational speed of drive spindle 38 and hence produce an output rotation having high speed/low torque. This is clearly shown in FIG. 2. The disengagement of drive clutch member 32 from driven clutch member 34, shown in FIG. 4, allows drive spindle 38 at second end 68, serving as pinion gear 70, to directly drive first reduction idler gear 74. One way clutch 78 prevents ring gear 72 from rotating in the opposite direction during disengagement.

Inertial device 62 is shown in FIG. 3 with drive clutch member 32 and driven clutch member 34 engaged. Plunger 54 has not yet been axially or longitudinally displaced in FIG. 3. FIG. 3 shows first ball pair 48 before motor drive 86 applies rotation to drive spindle 38 and hence the power tool is at rest or after motor drive 86 rotates drive spindle 38 and drive clutch member 32 continues to engage driven clutch member 34.

In the embodiment of inertial device 62 shown in FIG. 3, first disc 92 and second disc 94 couple to drive spindle 38 near first tapered end 56 by dowel pins (not shown) and pivotally couple to one another through dowel pin 90 and dowel slot 96. Rotation of drive spindle 38 causes first disc 92 and second disc 94 to rotate with respect to drive spindle 38 and with respect to one another through dowel slot 96 and dowel pin 90. The resulting movement of first disc 92 and second disc 94 applies a radially inward force on first ball pair 48 which in turn translates to an axial or longitudinal force on plunger 54 through first tapered end 56. Inertial device 62 may be modified to apply a radially inward force to a single ball or to a plurality of balls disposed in corresponding holes.

Once drive clutch member 32 and driven clutch member 34 disengage, as shown in FIG. 4, inertial device 62 prevents plunger 54 from moving axially or longitudinally away from reset spring 60 by continuously applying a radially inward force on first ball pair 48. Hence, drive clutch member 32 and driven clutch member 34 remain disengaged until all rotation stops and inertial device 62 allows reset spring 60 to axially or longitudinally force plunger 54 away from driven clutch member 34 by allowing first tapered end 56 to force first ball pair 48 radially outward and resetting inertial device 62 as shown in the embodiment illustrated in FIG. 3.

An important aspect of the present invention and particularly inertial device 62 includes preventing a gear shifting power tool from shifting from a relative low speed/high torque output condition back into a relative high speed/low torque output condition before the proper high torque has been applied at the output. This ensures proper tightening of fasteners and proper application of a relative high torque.

Because the invention prevents rotatably-driven, torque-responsive, gear shift device 30 from shifting back into the engaged mode, the present invention provides safer operation of gear shifting power tools by preventing tool slippage as a result of undesirable and unexpected automatic gear shifts. The ability to deliver both high speed/low torque output and low speed/high torque output through the use of an automatic gear shifting device allows the use of a lower rpm motor which may allow the use of an oil free motor. When the motor driving the gear shifting power tool is a pneumatic motor or fluid driven motor, the automatic gear shifting power tool allows for a reduction in air or fluid consumption and hence reduced noise levels and cost.

The present invention allows for the selection of a torque at which gear shifting is desired by adjusting the compression on torque spring 40 through the positioning of adjustment nut 42 in the embodiment shown in the FIGURES. This may also be accomplished through the desired sizing of torque spring 40. The self-contained operation of the gear shifting power tool allows for power tools with reduced size and weight.

The present invention does not use any external fluids to apply pressure to engage and disengage clutch members. The absence of reliance on external fluids increases reliability and enhances responsiveness to applied torques. Finally, the use of ball screw arrangement 64 and having ball keys 102 and ball screw keyway 104, allows for full and complete disengagement of drive clutch member 32 from driven clutch member 34 which reduces internal frictional wear and increases reliability.

Although the present invention and its advantages have been described in detail, it should be understood that various changes, substitutions and alterations can be made therein without departing from the spirit and scope of the invention as defined by the appended claims.

What is claimed is:

1. A rotatably-driven, torque-responsive, gear shift device for use in power tool, the gear shift device comprising:
    a drive spindle having a first tapered end, a second tapered end, and a partially hollow interior volume;
    a plunger positioned within the partially hollow interior volume of the drive spindle;
    a reset biasing means for urging the plunger in the partially hollow interior volume of the drive spindle away from the second end;
    an inertial device coupled to the drive spindle;
    a drive clutch member drivably engaged to the drive spindle; and
    a biasing means between the drive spindle and the drive clutch member.

2. The rotatably-driven, torque-responsive, gear shift device of claim 1, wherein the drive spindle has a first hole and a second hole, and further comprising a first ball movably positioned within the first hole and contacting the plunger near the first tapered end, and a second ball movably positioned within the second hole and contacting the plunger near the second tapered end.

3. The rotatably-driven, torque-responsive, gear shift device of claim 1, wherein the drive spindle has a first pair of holes spaced about 180 degrees on the drive spindle, and a second pair of holes spaced about 180 degrees on the drive spindle, and further comprising a first pair of balls movably positioned within the first pair of holes and contacting the plunger near the first tapered end, and a second pair of balls movably positioned within the second pair of holes and contacting the plunger near the second tapered end.

4. The rotatably-driven, torque-responsive, gear shift device of claim 1, wherein the second end of the drive spindle is operable as a pinion for a gear set.

5. The rotatably-driven, torque-responsive, gear shift device of claim 1, further comprising:
    a driven clutch member having a ring gear and engageable with the drive clutch member.

6. The rotatably-driven, torque-responsive, gear shift device of claim 5, further comprising:
    a one way clutch allowing rotation of the driven clutch member in one direction.

7. The rotatably-driven, torque-responsive, gear shift device of claim 3, wherein the drive clutch member is drivably engaged to the drive spindle through a ball screw arrangement.

8. The rotatably-driven, torque-responsive, gear shift device of claim 1, wherein the inertial device comprises:
   a first eccentric shaped disc mounted on the drive spindle; and
   a second eccentric shaped disc mounted on the drive spindle about 180 degrees away from the first eccentric shaped disc and pivotally coupled to the first eccentric disc to provide a force on the plunger in response to rotational motion.

9. A rotatably-driven, torque-responsive, gear shift device comprising:
   a drive spindle having a first end, a second end, a first hole, a second hole, and a partially hollow interior volume;
   a plunger having a first tapered end and a second tapered end, the plunger positioned within the partially hollow interior volume of the drive spindle;
   a reset biasing means coupled to the second tapered end of the plunger and positioned in the partially hollow interior volume of the drive spindle;
   a first ball movably positioned within the first hole of the drive spindle and contacting the plunger near the first tapered end;
   a second ball movably positioned within the second hole of the drive spindle and contacting the plunger near the second tapered end;
   an inertial device coupled to the drive spindle near the first hole and in contact with the first ball;
   a drive clutch member drivably engaged to the drive spindle and having an inner axial groove for receiving a portion of the second ball; and
   a biasing means between the drive spindle and the drive clutch member.

10. The rotatably-driven, torque-responsive, gear shift device of claim 9, wherein the biasing means is a torque spring.

11. The rotatably-driven, torque-responsive, gear shift device of claim 9, wherein the drive spindle has first holes and second holes, and further comprising a first plurality of balls movably positioned within the first holes and contacting the plunger near the first tapered end, and a second plurality of balls movably positioned within the second holes and contacting the plunger near the second tapered end.

12. The rotatably-driven, torque-responsive, gear shift device of claim 9, wherein the drive spindle has a first pair of holes spaced about 180 degrees on the drive spindle, and a second pair of holes spaced about 180 degrees on the drive spindle, and further comprising a first pair of balls movably positioned within the first pair of holes and contacting the plunger near the first tapered end, and a second pair of balls movably positioned within the second pair of holes and contacting the plunger near the second tapered end.

13. The rotatably-driven, torque-responsive, gear shift device of claim 9, wherein the second end of the drive spindle is operable as a pinion for a gear set.

14. The rotatably-driven, torque-responsive, gear shift device of claim 11, wherein the drive spindle has a cylindrical shape.

15. The rotatably-driven, torque-responsive, gear shift device of claim 7, wherein the plunger has a cylindrical shape.

16. The rotatably-driven, torque-responsive, gear shift device of claim 9, further comprising:
   a driven clutch member having a ring gear and engageable with the drive clutch member.

17. The rotatably-driven, torque-responsive, gear shift device of claim 16, further comprising:
   a one way clutch allowing rotation of the driven clutch member in one direction.

18. The rotatably-driven, torque-responsive, gear shift device of claim 17, Wherein the one way clutch is a sprag clutch.

19. The rotatably-driven, torque-responsive, gear shift device of claim 9, wherein the reset biasing means is a spring.

20. The rotatably-driven, torque-responsive, gear shift device of claim 9, wherein the inertial device comprises:
   a first eccentric shaped disc mounted on the drive spindle; and
   a second eccentric shaped disc mounted on the drive spindle about 180 degrees away from the first eccentric shaped disc and pivotally coupled to the first eccentric disc to provide a radially inward force on the first ball in response to rotational motion.

21. The rotatably-driven, torque-responsive, gear shift device of claim 9, wherein the drive clutch member is drivably engaged to the drive spindle through a ball screw arrangement.

22. The rotatably-driven, torque-responsive, gear shift device of claim 21, wherein the ball screw arrangement comprises a plurality of interfitting ball keys and keyways which tends to axially separate the drive clutch member from the driven clutch member in response to a resistive torque on the drive spindle.

23. A gear shifting power tool comprising:
   a casing;
   a motor disposed within the casing;
   a rotatably-driven, torque-responsive, gear shift device having a first end and a second end, rotatably coupled to the motor at the first end, the gear shift device including:
      a drive spindle having a first end, a second end, a first hole, a second hole, and a partially hollow interior volume;
      a plunger having a first tapered end and a second tapered end, the plunger positioned within the partially hollow interior volume of the drive spindle;
      a reset biasing means coupled to the second tapered end of the plunger and positioned in the partially hollow interior volume of the drive spindle;
      a first ball movably positioned within the first hole of the drive spindle and contacting the plunger near the first tapered end;
      a second ball movably positioned within the second hole of the drive spindle and contacting the plunger near the second tapered end;
      an inertial device coupled to the drive spindle near the first hole and in contact with the first ball;
      a drive clutch member drivably engaged to the drive spindle and having an inner axial groove for receiving a portion of the second ball; and
      a biasing means for applying a force between the drive spindle and the drive clutch member;
   a driven clutch member having a ring gear; and
   a gear set drivably engaged with the ring gear of the driven clutch member.

24. The gear shifting power tool of claim 23, wherein the biasing means comprises a torque spring.

25. The gear shifting power tool of claim 23, wherein the drive spindle has first holes and second holes, and further comprising a first plurality of balls movably positioned within the first holes and contacting the plunger near the first tapered end, and a second plurality of balls movably positioned within the second holes and contacting the plunger near the second tapered end.

26. The gear shifting power tool of claim 23, wherein the drive spindle has a first pair of holes spaced about 180 degrees on the drive spindle, and a second pair of holes spaced about 180 degrees on the drive spindle, and further comprising a first pair of balls movably positioned within the first pair of holes and contacting the plunger near the first tapered end, and a second pair of balls movably positioned within the second pair of holes and contacting the plunger near the second tapered end.

27. The gear shifting power tool of claim 23, wherein the second end of the drive spindle is operable as a pinion for a gear set.

28. The gear shifting power tool of claim 23, wherein the drive spindle has a cylindrical shape.

29. The gear shifting power tool of claim 23, wherein the plunger has a cylindrical shape.

30. The gear shifting power tool of claim 23, further comprising:

a driven clutch member having a ring gear and engageable with the drive clutch member.

31. The gear shifting power tool of claim 30, further comprising:

a one way clutch allowing rotation of the driven clutch member in one direction.

32. The gear shifting power tool of claim 31, wherein the one way clutch is a sprag clutch.

33. The gear shifting power tool of claim 23, wherein the reset biasing means is a spring.

34. The gear shifting power tool of claim 23, wherein the inertial device comprises:

a first eccentric shaped disc mounted on the drive spindle; and a second eccentric shaped disc mounted on the drive spindle about 180 degrees away from the first eccentric shaped disc and pivotally coupled to the first eccentric disc to provide a radially inward force on the first ball in response to rotational motion.

35. The gear shifting power tool of claim 23, wherein the drive clutch member is drivably engaged to the drive spindle through a ball screw arrangement.

36. The gear shifting power tool of claim 23, wherein the ball screw arrangement comprises a plurality of interfitting ball keys and keyways which tends to axially separate the drive clutch member from the driven clutch member in response to a resistive torque applied to the drive spindle.

37. A method for shifting gears, in response to an applied resistive torque, from an output rotational motion having relative high speed and low torque to an output rotational motion having relative low speed and high torque, the method comprising the steps of:

engaging a drive clutch member to a driven clutch member where the drive clutch member has an inner axial groove and is drivably engaged to a drive spindle having a partially hollow interior volume, a first hole, a second hole, a first end, and a second end;

biasing a plunger longitudinally away from the second end of the drive spindle where the plunger is positioned in the partially hollow interior volume of the drive spindle and contains a first tapered end and a second tapered end;

rotating the drive spindle with a motor;

applying a radially inward force to a first ball tending to force the first ball radially inward through the first hole towards plunger to provide a longitudinal force on the plunger opposite the biasing applied to the plunger in the step of biasing a plunger longitudinally;

applying a torque to the drive spindle that resists the rotation of the drive spindle produced by the motor;

disengaging the drive clutch member from the driven clutch member in response to the step of applying a torque to the drive spindle that resists the rotation of the drive spindle by compressing a spring between the drive clutch member and the drive spindle so that the drive clutch member moves longitudinally away from the driven clutch member and the inner axial groove positions over the second hole in the drive spindle;

moving the plunger longitudinally towards the second end of the drive spindle in response to the step of applying a radially inward force on the first ball and the step of disengaging the drive clutch member from the driven clutch member; and forcing a second ball radially outward through the second hole of the drive spindle and into the inner axial groove of the drive clutch member in response to moving the plunger longitudinally towards the second end of the drive spindle.

38. The method of claim 37, wherein the drive spindle has a first end and a second end and the second end is operable as a pinion of a gear set.

39. The method of claim 38, wherein the second end of the drive spindle is the pinion for a planetary gear set.

40. The method of claim 37, wherein the driven clutch member has a ring gear for driving a gear set.

41. The method of claim 37, wherein the step of applying a radially inward force to a first ball includes applying the radially inward force with an inertial device having a first eccentric shaped disc mounted on the drive spindle and a second eccentric shaped disc mounted on the drive spindle about 180 degrees away from the first eccentric shaped disc and pivotally coupled to the first eccentric disc to provide the radially inward force on the first ball in response to rotational motion.

42. The method of claim 39, wherein the step of disengaging the drive clutch member from the driven clutch member includes the drive clutch member being drivably engaged to the drive spindle through a ball screw arrangement and wherein the drive clutch member moves longitudinally away from the driven clutch member in response to the step of applying a torque to the drive spindle that resists the rotation of the drive spindle.

\* \* \* \* \*